No. 683,087. Patented Sept. 24, 1901.
J. WESTLEY.
THROUGHWAY TAP.
(Application filed July 2, 1901.)
(No Model.)
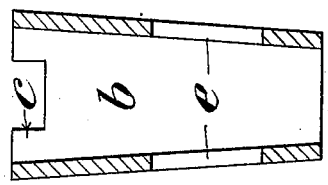
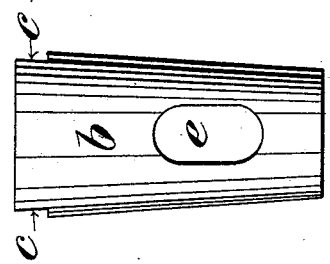
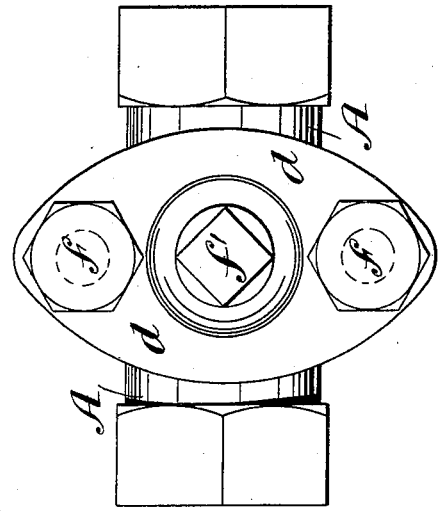
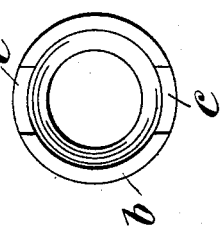
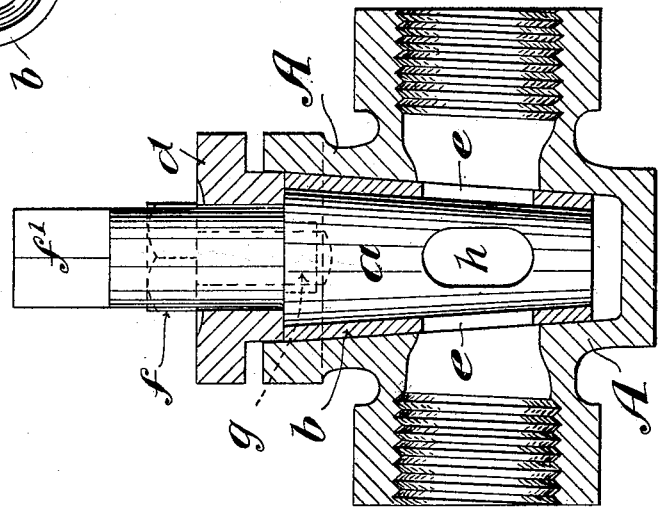
Witnesses
Isabella Waldron.
Adelaide C Gleason
Inventor.
James Westley
By his atty Richardson
THE NORRIS PETERS CO., PHOTO-LITHO., WASHINGTON, D. C.

UNITED STATES PATENT OFFICE.

JAMES WESTLEY, OF LEVENSHULME, ENGLAND.

THROUGHWAY-TAP.

SPECIFICATION forming part of Letters Patent No. 683,087, dated September 24, 1901.

Application filed July 2, 1901. Serial No. 66,887. (No model.)

*To all whom it may concern:*

Be it known that I, JAMES WESTLEY, brass-founder, a subject of the King of Great Britain and Ireland, residing at 10 South View, Belvoir avenue, Levenshulme, in the county of Lancaster, England, have invented certain new and useful Improvements in or Connected with Throughway-Taps, (for which I have made application in Great Britain, No. 8,661, dated April 27, 1901,) of which the following is a specification.

My invention relates to throughway-taps used for controlling the supply of water, steam, or other fluids, as is well understood, and has reference to an improved method of packing such taps to prevent the escape of fluid.

In the accompanying drawings, Figure 1 shows in sectional elevation a throughway-tap constructed in accordance with my invention. Fig. 2 is a plan, and Figs. 3 to 5 detail views.

According to my invention I provide a suitable valve-box A, having a throughway-plug $a$, which is preferably formed taper, and I incase the plug $a$ with a tube $b$ of vulcanized rubber composition, asbestos, or of any material suitable for packing purposes. The material from which the tube $b$ is composed forms no part of my invention, and I may employ any suitable packing composition for the purpose which can be formed or molded to the requisite shape. The packing-tube $b$ is formed with recesses $c$, engaging with corresponding lugs $g$, formed on the gland $d$ to prevent the tube $b$ from turning. The packing-tube $b$ is formed with passages $e$ for the transmission of fluid, which passages I may line with metal, if necessary or desirable, to prevent undue wear upon the packing material by the passage of the fluid. The gland $d$ is arranged upon the top of the packing-tube $b$ and the throughway-plug $a$, and pressure being brought to bear by means of the gland through the screws $f$ a fluid-tight joint is readily made and maintained. In Fig. 1 the passage $h$ of the plug $a$ is turned so as to cut off supply. By means of a suitable handle engaging with the squared end $f$ of the plug $a$ the plug may be turned until the throughway-passage $h$ corresponds with the passages $e$ in the tube $b$. The tube $b$, as stated, is prevented from turning by means of the projections or lugs $g$ on the gland $d$, which engage with the recesses $c$ of the tube $b$. In Fig. 3 I show a sectional elevation of the tube $b$. Fig. 4 is an outside view at right angles to Fig. 3, and Fig. 5 is a plan. The packing-tubes $b$ may be easily molded to the requisite size and shape from suitable packing material or composition.

An important feature of my invention consists in the ease with which the packing-tube $b$ when worn out may be renewed, as on removal of the gland the plug $a$ and packing-tube $b$ may be at once removed from the body of the valve and a new tube placed upon the plug $a$, which is then returned to the valve-box and the gland again screwed down. One gland only is required, as the bottom of the valve box or chamber is closed. The upper end of the packing has a plain edge—*i. e.*, it is not flanged and the gland $d$ by pressing thereon will adjust the packing.

I declare that what I claim is—

In combination, the tap $a$ and its casing having a projection $g$, a packing having an upwardly-opening notch engaging said projection and having its upper edge plain and a gland bearing on said plain edge to adjust the packing, substantially as described.

In witness whereof I have hereunto set my hand in presence of two witnesses.

JAMES WESTLEY.

Witnesses:
 JOSHUA ENTWISLE,
 ALFRED YATES.